Dec. 7, 1937.  A. L. ROSENMUND  2,101,457
BOX MAKING MACHINE
Filed Aug. 21, 1935   15 Sheets-Sheet 1

INVENTOR.
A.L. ROSENMUND
BY Blair, Curtis & Dunne
ATTORNEYS.

Dec. 7, 1937.  A. L. ROSENMUND  2,101,457
BOX MAKING MACHINE
Filed Aug. 21, 1935  15 Sheets-Sheet 2

INVENTOR.
A. L. ROSENMUND
BY Blair, Curtis & Dunne
ATTORNEYS.

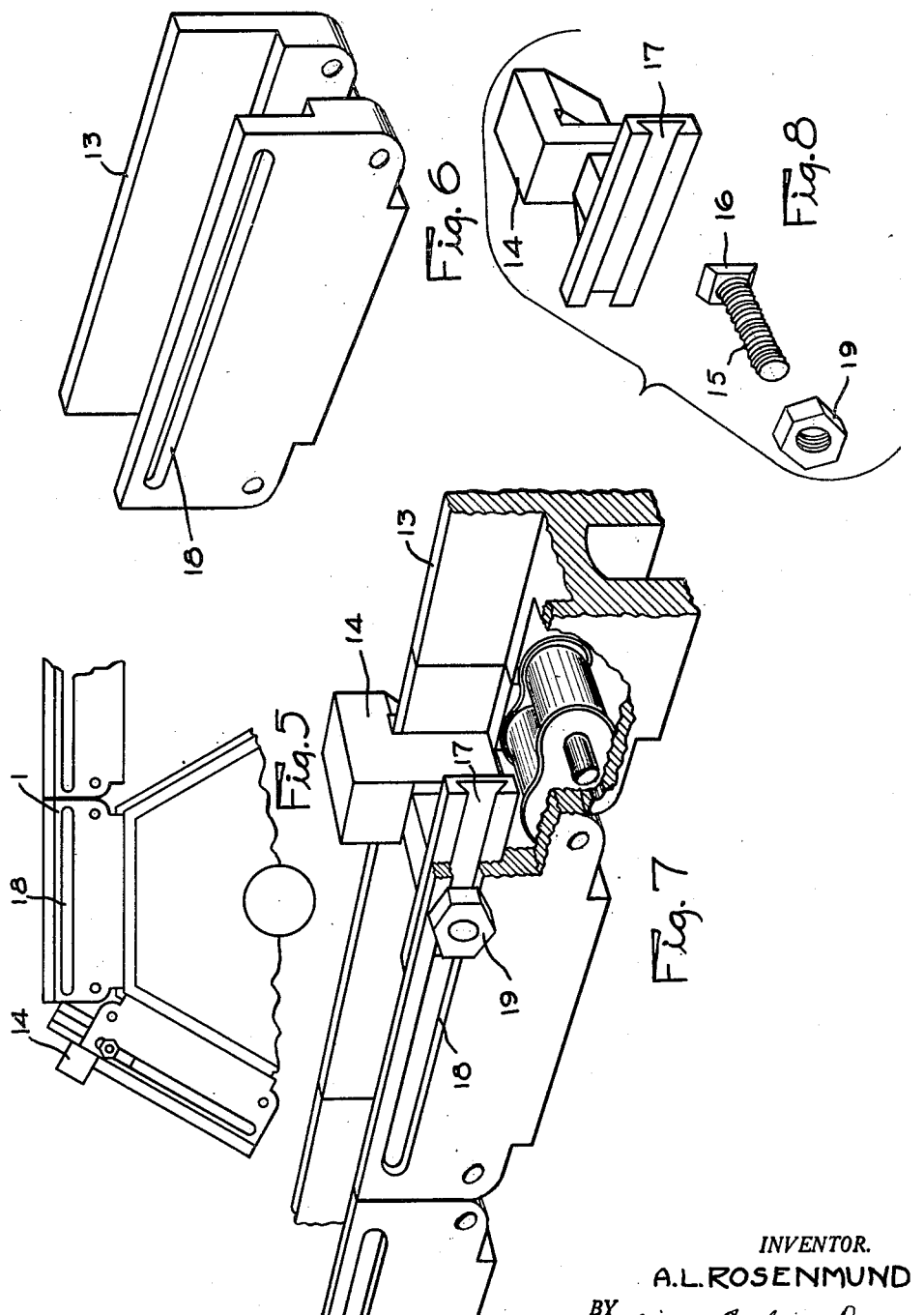

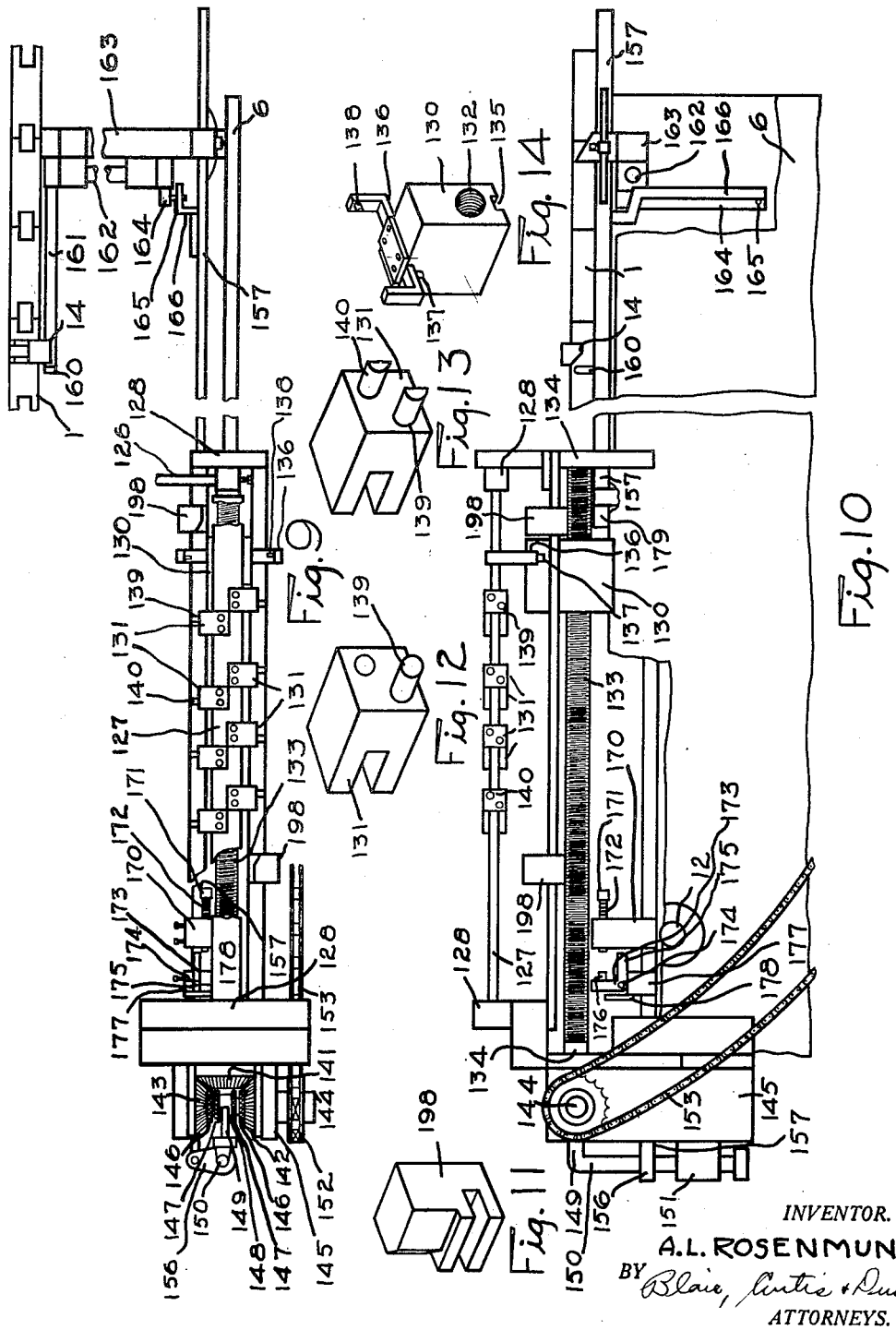

Dec. 7, 1937.   A. L. ROSENMUND   2,101,457
BOX MAKING MACHINE
Filed Aug. 21, 1935   15 Sheets-Sheet 7
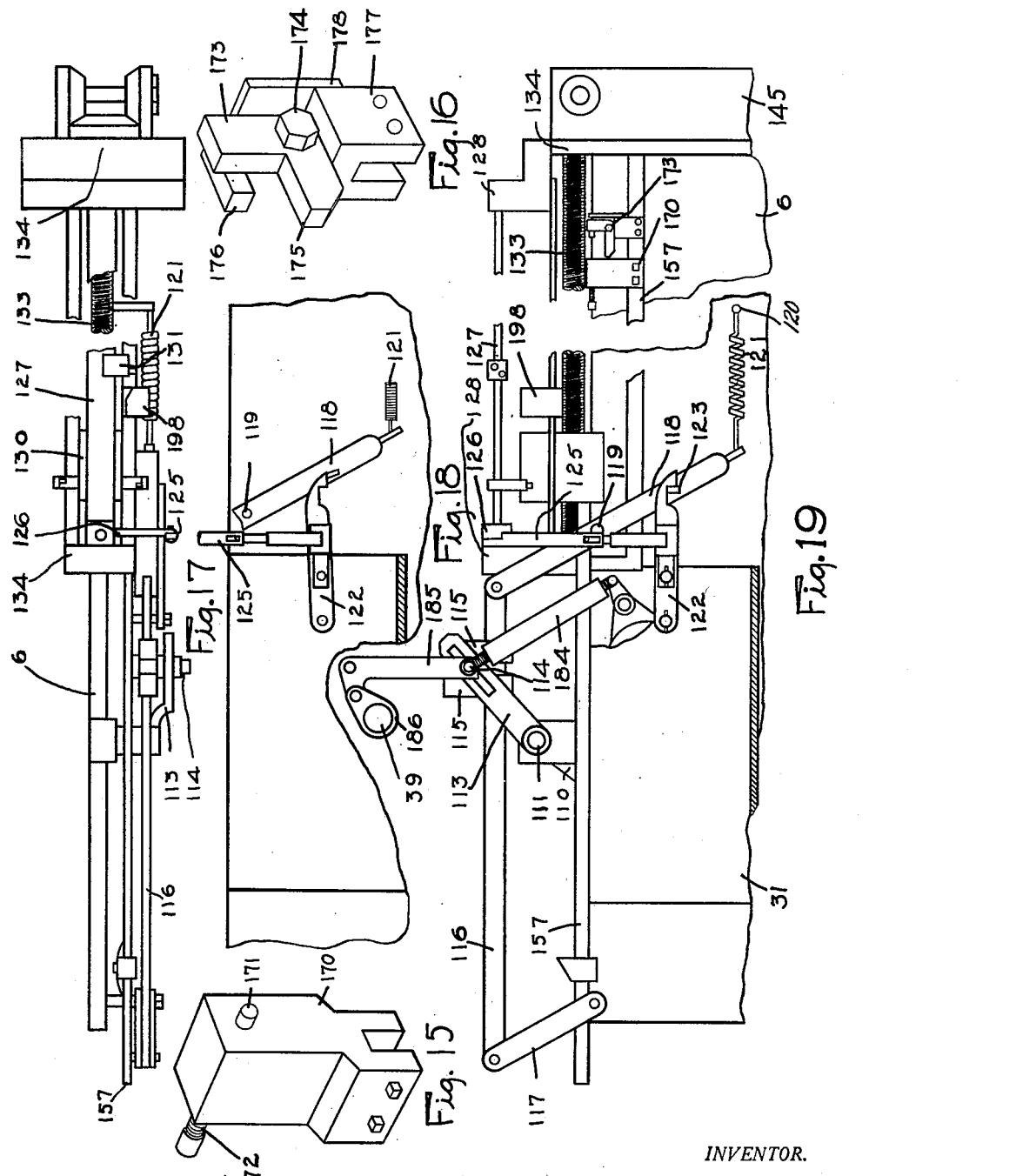
INVENTOR.
A. L. ROSENMUND
BY Blair, Curtis & Dunne
ATTORNEYS.

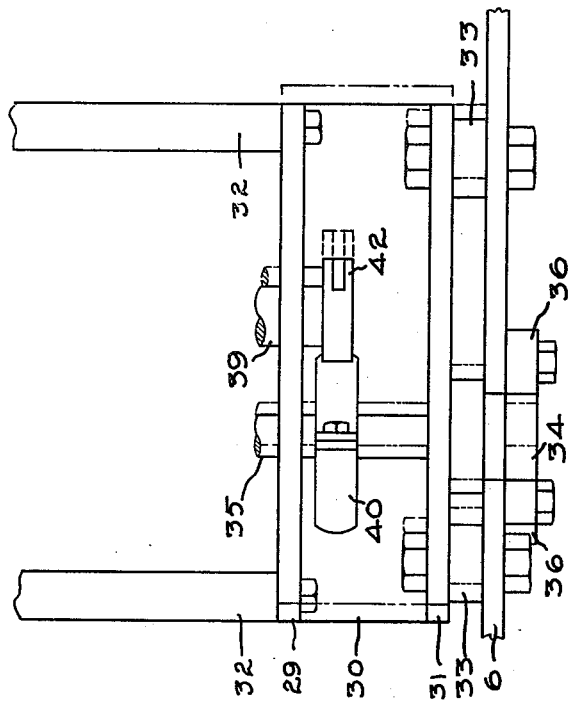
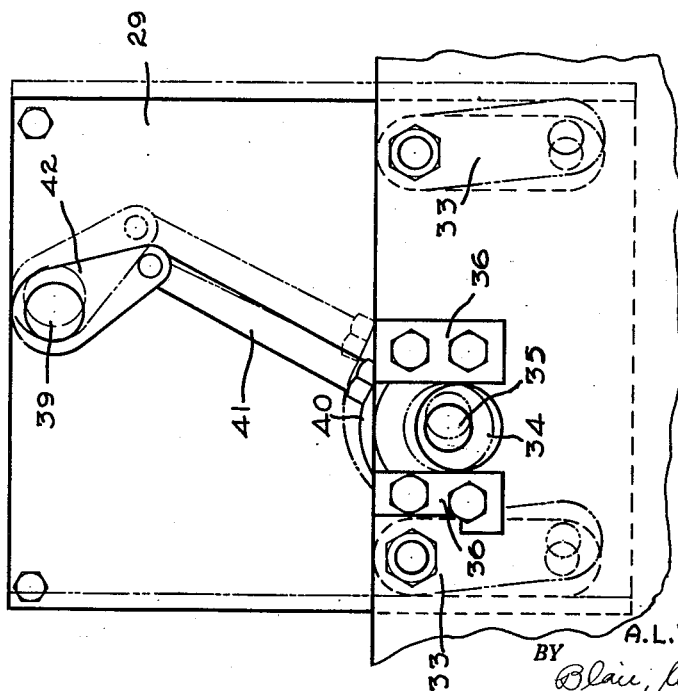

Dec. 7, 1937.   A. L. ROSENMUND   2,101,457
BOX MAKING MACHINE
Filed Aug. 21, 1935   15 Sheets—Sheet 9

INVENTOR.
A.L.ROSENMUND
BY
ATTORNEYS.

Dec. 7, 1937. A. L. ROSENMUND 2,101,457
BOX MAKING MACHINE
Filed Aug. 21, 1935 15 Sheets—Sheet 10
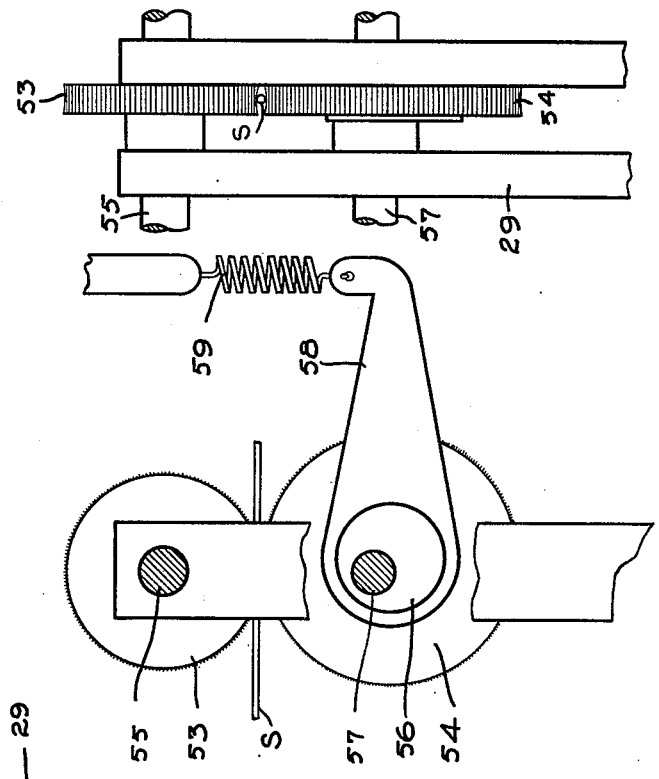
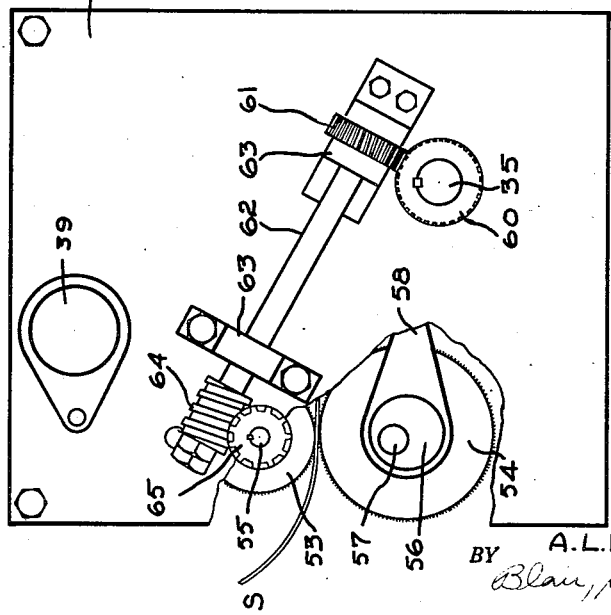
INVENTOR.
A. L. ROSENMUND
BY
ATTORNEYS.

Dec. 7, 1937.  A. L. ROSENMUND  2,101,457
BOX MAKING MACHINE
Filed Aug. 21, 1935  15 Sheets-Sheet 11

INVENTOR.
A. L. ROSENMUND
BY Blair, Curtis & Dunne
ATTORNEYS.

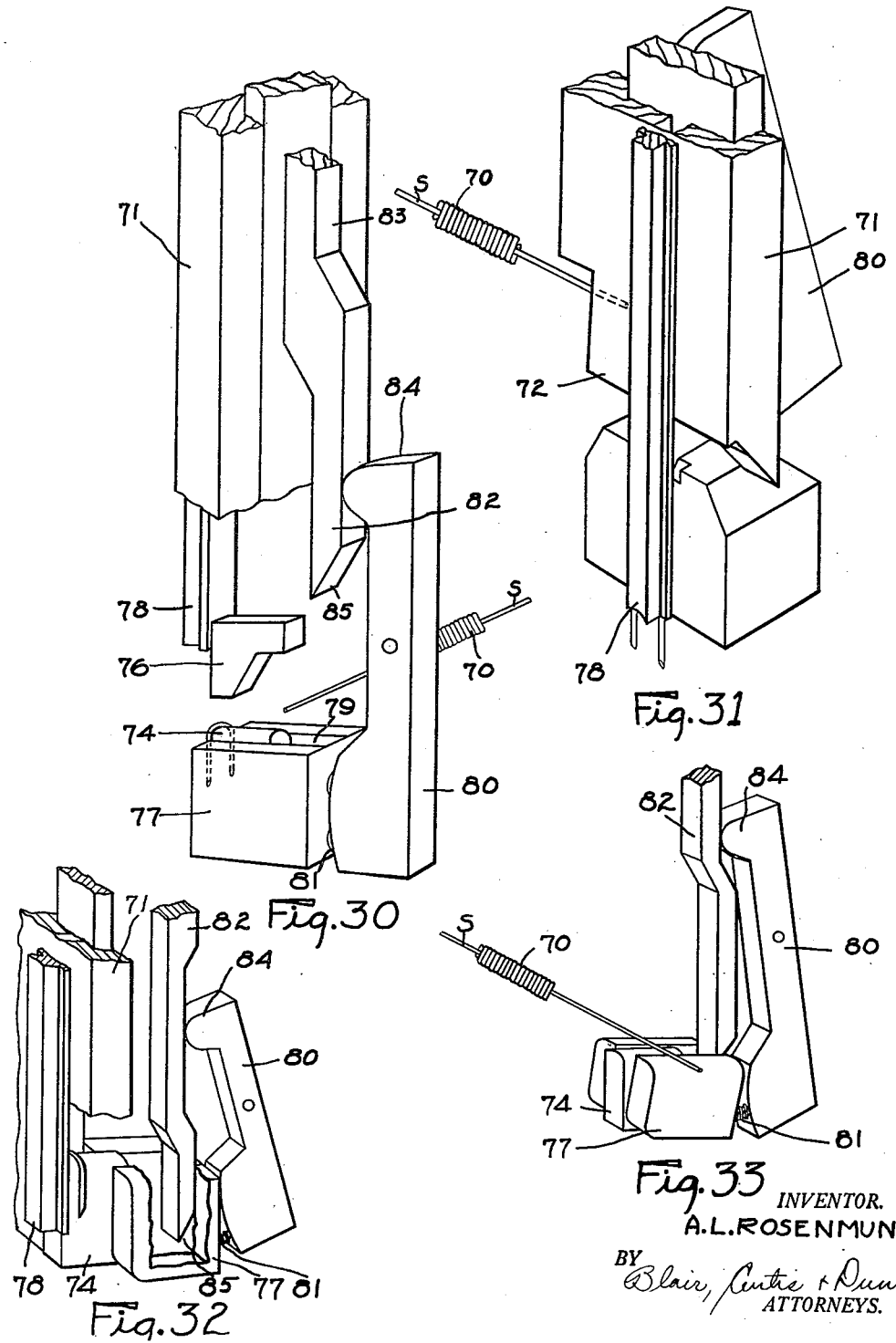

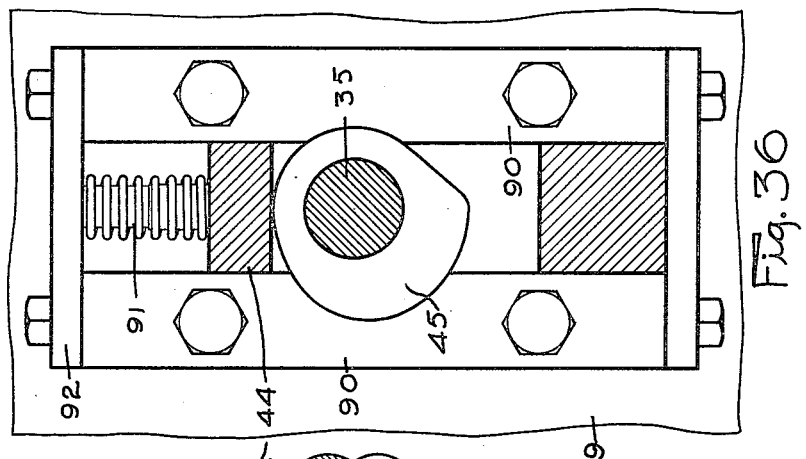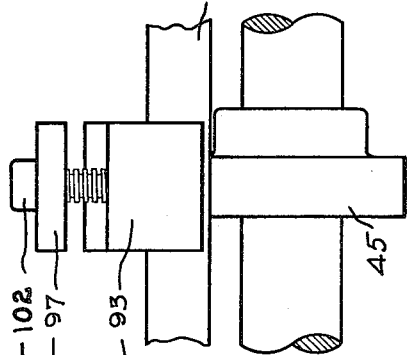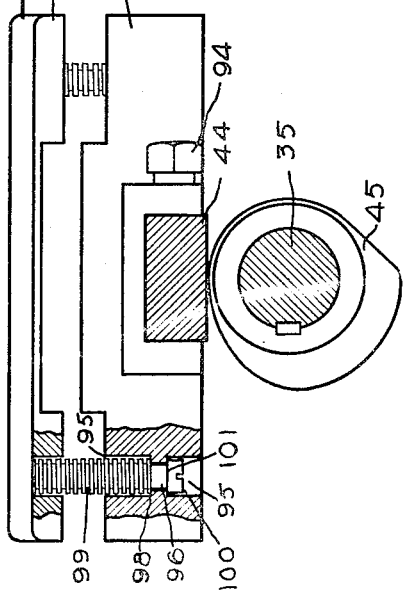

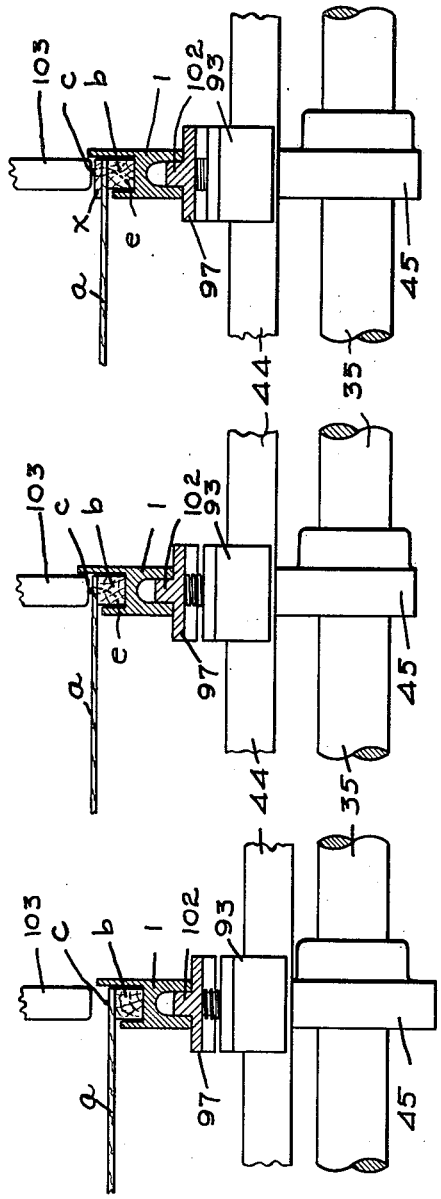

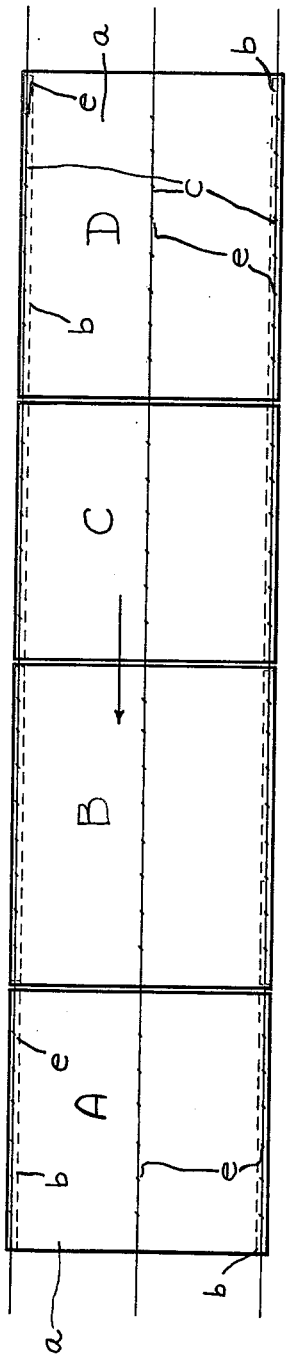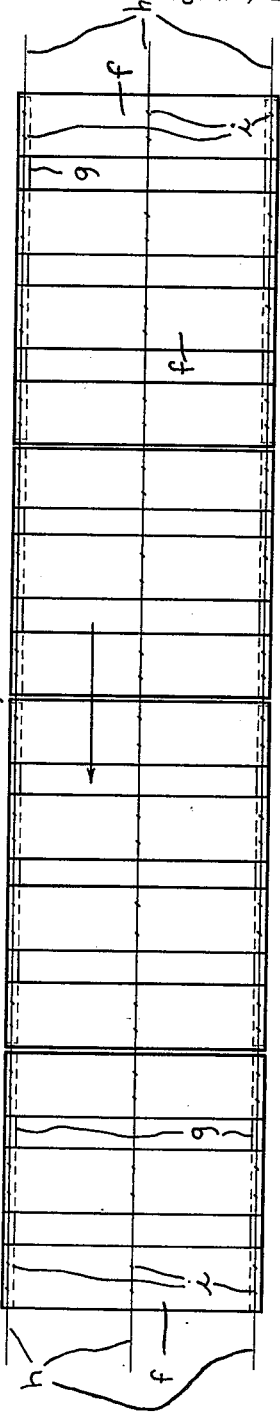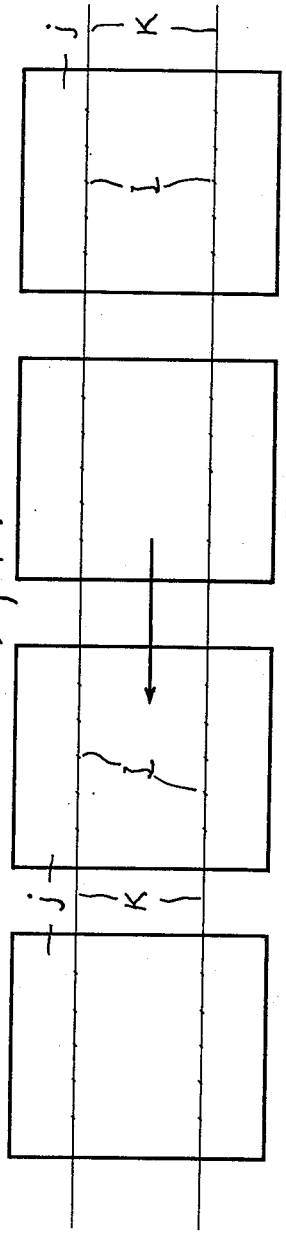

Patented Dec. 7, 1937

2,101,457

UNITED STATES PATENT OFFICE 2,101,457

BOX MAKING MACHINE

Alfred L. Rosenmund, Rockaway, N. J., assignor to Stapling Machines Co., a corporation of Delaware Application August 21, 1935, Serial No. 37,107

27 Claims. (Cl. 1—8.2)

This invention relates to box making machinery and particularly to machines for stapling binding wires to box parts.

It is an object of the invention to provide certain improvements in a machine of the character described.

It is another object to provide a machine of the character described which may be economically manufactured and operated and which is durable in construction and efficient in operation.

It is another object of the invention to provide a machine of the character described which is so constructed and arranged as to permit operating the same with a minimum of power.

It is a further object of the invention to provide a machine of the character described which is so constructed and arranged as to reduce wear and tear on the operating parts.

It is another object of the invention to provide improved means for positioning or locating the staples which are driven into the box parts.

Other objects will be in part obvious and in part pointed out hereinafter.

One illustrative embodiment of the invention is shown in the accompanying drawings, in which:—

Fig. 5 is an enlarged side elevation of one of the sprocket wheels for the conveyor link chain and showing the manner in which the links of the chain pass around the sprocket wheel.

Fig. 6 is an enlarged perspective view of one of the links of the conveyor chain.

Fig. 7 is a perspective view of a succession of links of the conveyor chain and showing secured to one of the links a lead block for throwing the staple controlling mechanism into operation.

Fig. 8 is a perspective view of a lead block and the means for securing it to a link.

Fig. 9 is an enlarged top plan view of the staple controlling mechanism.

Fig. 10 is a side elevation of the same.

Fig. 11 is a perspective view of a shifter block used in the staple controlling mechanism.

Fig. 12 is a perspective view of one type of trip block used in the staple controlling mechanism.

Fig. 13 is a perspective view of another type of trip block used in the staple controlling mechanism.

Fig. 14 is a perspective view of a feed screw nut used in the staple controlling mechanism.

Figs. 15 and 16 are perspective views of devices used in the staple controlling mechanism to reverse the travel of the feed screw nut.

Fig. 17 is a top plan view of the devices which throw the stapling mechanism into and out of operation.

Fig. 18 is a side elevation of the inside of the left hand frame of the stapler carriage viewed from the right hand side of the machine and showing the latch and control bar which operate the clutch buffer and brake.

Fig. 19 is a side elevation of the devices shown in Fig. 17 viewed from the right hand side of the machine.

Fig. 20 is an enlarged side elevation of the stapler carriage viewed from the left hand side of the machine and illustrating the manner in which the carriage is rocked to move with the work during a stapling operation and to return to initial position following a stapling operation.

Fig. 21 is a top plan view of the same.

Fig. 24 is an enlarged side elevation of the mechanism for feeding staple stock wire to the staple forming and driving units.

Figs. 25 and 26 are enlarged detail views of the staple stock wire feeding mechanism, being respectively a side elevation and an end elevation.

Figure 1:
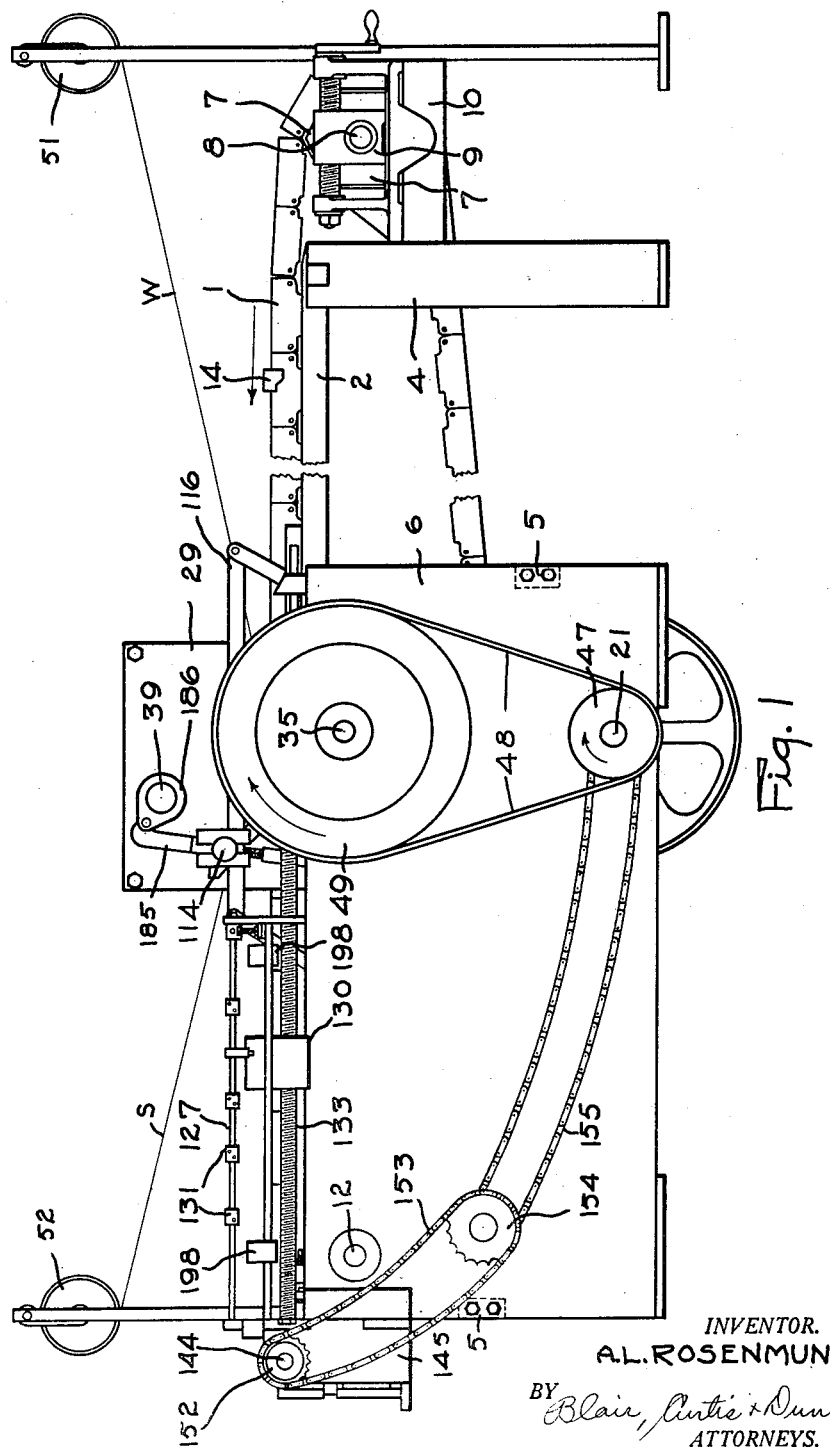
Figure 1 is a side elevation of a wirebound box blank machine embodying the invention viewed from the left side of the machine, i. e., from the left in Fig. 4.

Figs. 30 to 33 inclusive are enlarged perspective views of details of a staple forming and driving unit during different phases of its operation.

Fig. 34 is an enlarged side elevation of the clincher mechanism and means for operating the same.

Fig. 35 is an end elevation of the same viewed from the receiving end of the machine.

Fig. 36 is a detailed sectional view of the end support for the clincher bar.

Fig. 37 is an end elevation partly in section of one of the clincher units beneath one of the conveyor chains and showing the position of the chain and the box parts relative to the stapler unit prior to a stapling and clinching operation.

Fig. 38 is a similar view but showing the position of the parts during a stapling and clinching operation.

Fig. 39 is a similar view but showing the manner in which the clincher accommodates itself to an additional thickness of box material.

Fig. 40 is similar to Fig. 37 but shows a clincher unit supporting a thin strip of side material without any cleat reenforcement; this view showing the position of the clincher and stock prior to a stapling operation.

Fig. 41 is similar to Fig. 40 but shows the position of the parts during a stapling and clinching operation.

Fig. 42 is similar to Fig. 41 but shows the manner in which the clincher accommodates itself to an added thickness of box material.

Fig. 43 is a top plan view of one product of the machine, namely, a wired cleat reenforced box blank.

Fig. 44 is a top plan view of another product of the machine, namely, a wired cleat reenforced crate blank.

Fig. 45 is a top plan view of still another product of the machine, namely, a series of wire-connected box or crate ends.

Referring to Figs. 43, 44, and 45, three different types of product which the machine of this invention is capable of producing are shown. Fig. 43 illustrates a wired cleat reenforced box blank consisting of four sections designated respectively A, B, C, and D, each section consisting of a sheet or sheets of side material $a$, cleats $b$, and binding wires $c$ stapled to the wooden elements by staples $e$. The wires $c$ extend across and are stapled to the several sections, thus connecting them in foldable relationship. The four sections A, B, C, and D when folded at right angles to each other form the front, bottom, rear and top of a box. Sections A and C for the front and rear sides of the box are usually of the same size, while sections B and D for the bottom and top of the box are also usually of the same size, but sections A and C may differ in size from sections B and D, depending upon the dimensions desired in the completed box. Sections A and C being of the same size require the same number of staples driven over each binding wire, while sections B and D may require a greater or lesser number of staples driven into each section than are driven into sections A and C. For example, in the illustrative box blank shown in Fig. 43, sections A and C each have six staples driven over each binding wire, while sections B and D have eight staples driven over each binding wire.

It is desirable that the first and last staple of each section shall be located a definite distance from the edge of the section, for example, 1¾ inches. It is also desirable that no staples be driven between the last staple of one section and the first staple of the next succeeding section.

In Fig. 44 is shown a wired cleat reenforced crate blank consisting of four sections of spaced slats $f$ reenforced by cleats $g$ and having wires $h$ stapled thereto by staples $i$. It is desirable that two staples $i$ be driven over each binding wire into each slat $f$; that each staple in each slat be located a definite distance from the edge of the slat; and that no staples be driven between slats or between sections of the blank.

In Fig. 45 is shown a succession of wire-connected box ends, each consisting of a sheet or sheets of box material $j$ having wires $k$ stapled thereto by staples $l$. When the wires have been stapled to a succession of box ends, as shown on the machine of this application, the wires connecting the successive box ends are severed and loops formed on the severed ends for the purpose of connecting the box end to the box sides. It is desirable that the first and last staple in each box end be positioned and located a definite distance from the edge of the box end.

The machine of this application receives the box elements to which the wire is to be stapled on endless conveyor chains which correctly position the box elements relative to each other and feed them continuously at substantially a uniform speed beneath staple forming and driving mechanism which forms and drives the staples over the binding wires into or through the box parts and clinches such staple legs as may be driven through the box parts.

The staple forming and driving units are supported on a carriage which is reciprocated or rocked to move with the work during a stapling operation and to return to initial position following a stapling operation.

The clincher mechanism is carried by the stapler carriage to move with the staplers during a staple driving and clinching operation.

Movement of the stapler carriage during the operation of the stapling and clinching units is controlled by a staple controlling mechanism which is thrown into operation as each box blank or other unit of work reaches the stapling plane, and thereafter automatically controls the driving of each successive staple which is driven into the box blank or unit of work, locating each staple where desired in the box blank or unit of work. When the last staple has been driven into the box blank or unit of work, the staple controlling mechanism is automatically thrown out of operation and no staples are driven until the forward edge of the next box blank or work unit reaches the stapling plane and again throws the staple controlling mechanism into operation, all as will now be described in detail.

Figure 2:
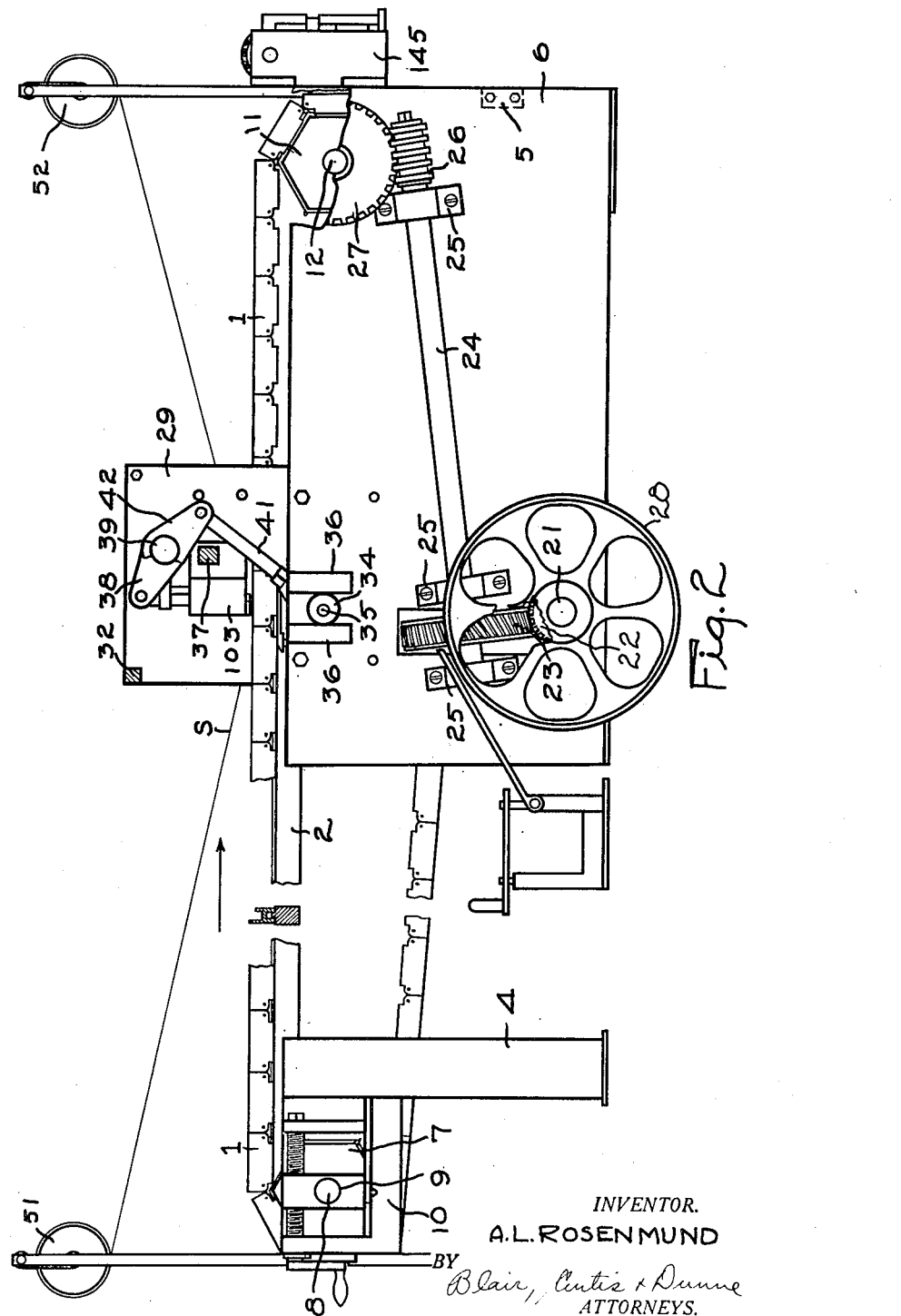
Fig. 2 is a side elevation of the machine viewed from the other or right hand side of the machine.
Figure 3:
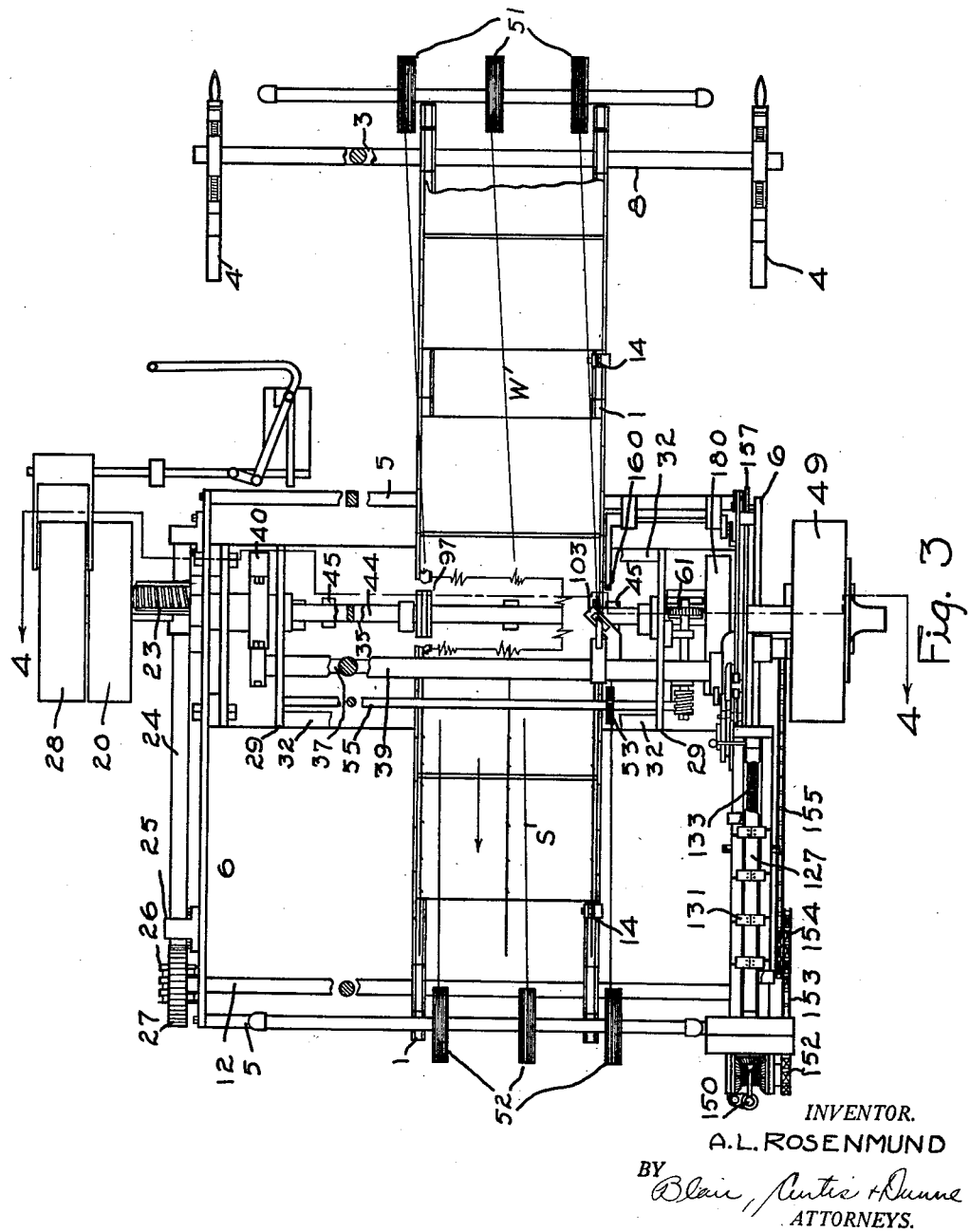
Fig. 3 is a top plan view of the machine with certain parts omitted.

Referring to Figs. 1, 2, and 3, the illustrative means for positioning and conveying the box parts through the machine comprise a pair of endless link chains 1 adapted to ride in channel guides 2 supported at the receiving end of the machine by a cross bar 3 which connects side frames 4, and at the delivery end of the machine by a cross bar 5 which connects side frames 6. At the receiving end of the machine the endless link chains 1 are trained over idler sprocket wheels 7 on a shaft 8 journaled in bearings 9 adjustably supported on brackets 10 extending from side frames 4. At the delivery end of the machine the endless link chains 1 are trained over driven sprocket wheels 11 keyed to a shaft 12 suitably journaled in bearings in the side frames 6. The chains 1 are preferably relatively adjustable laterally to accommodate boxes or crates of different dimensions and may be lengthened or shortened by inserting or removing links, the bearings 9 for shaft 8 being adjustable from and toward shaft 12 to accommodate variations in the length of the chains 1.

As best shown in Figs. 6 and 7, the links of the endless chains 1 are preferably channel-shaped to receive the cleats of a box or crate blank and the outer flange 13 serves to prevent lateral movement of the box side material, and also serves as a support for the blocks which position the box parts and for the blocks which control the operation of the staple controlling mechanism hereinafter described.

A control block for the staple controlling mechanism is shown in Figs. 7 and 8 and is designated 14. The block 14 and other blocks which are used for positioning the box parts may be secured to the links of the endless chains 1 by means of a screw bolt 15 having a head 16 to dovetail in a slot 17 in the block, and the outer end of which bolt extends through a slotted opening 18 formed in the inner flange of the link. The screw bolt 15 may be held in tightened position by a nut 19. Because the blocks can be secured to the links of the endless chain 1 by means of one bolt, the extremity of the block may extend beyond the end of a link and into an adjacent link without interfering with the passage of the links over the sprocket wheels (see Fig. 5).

Figure 4:
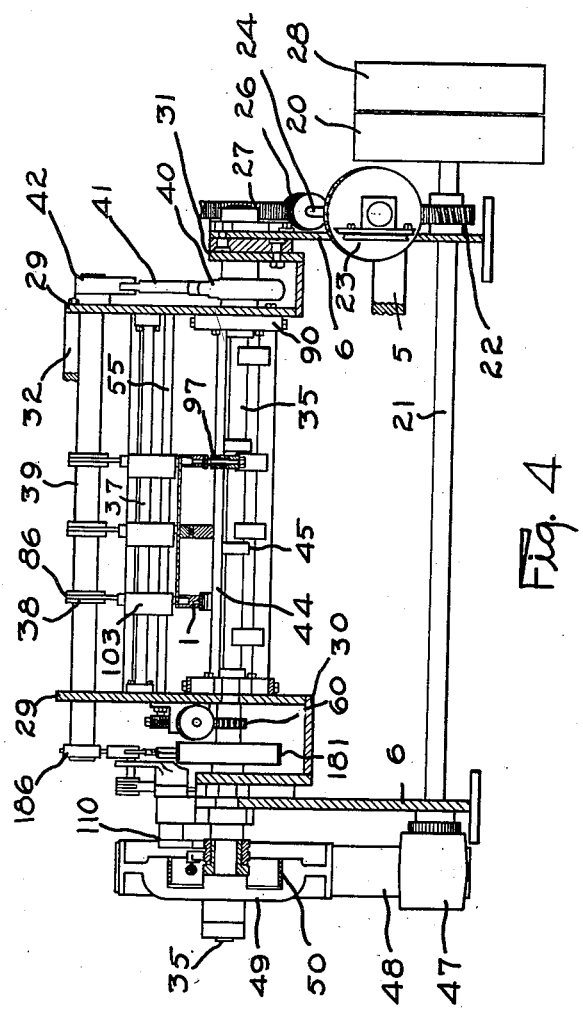
Fig. 4 is a sectional view taken on the line 4—4 of Fig. 3.

As shown in Figs. 2 and 4, the endless link chains 1 are advanced continuously at approximately a uniform speed by a suitable shaft and gear connection with a drive pulley 20 on a drive shaft 21 journaled in side frames 6. Fixed on the drive shaft 21 is a helix gear 22 which drives a helical gear 23 fixed to a shaft 24 journaled in bearings 25 mounted on side frame 6. The other end of shaft 24 carries a worm 26 which drives a gear 27 fast on shaft 12. Rotation of shaft 12 drives sprocket wheels 11 secured thereto and advances endless link chains 1 continuously at substantially a uniform speed. The distance through which the endless link chains are moved per revolution of the drive pulley may be varied by utilizing different combinations of reduction gears. In the illustrative machine the gearing is such that the link chains 1 move 1½ inches per revolution of the drive pulley 20. Rotatably mounted on the end of shaft 21 is an idler pulley 28 to which the drive belt (not shown) may be shifted to stop the machine.

Thus it will be seen that when the drive belt (not shown) is shifted from idler pulley 28 to drive pulley 20, drive shaft 21 will be rotated and conveyor chains 1 carrying the box parts will be advanced continuously at substantially a uniform speed.

The mechanism for forming, driving and clinching the staples is supported by a stapler carriage which is caused to move with the box parts and at substantially the same rate of speed during a staple driving operation and then return to initial position.

As shown in Fig. 4, the stapler carriage consists of two frames each having an inside plate 29, a base plate 30, and an outside plate 31. The two frames are connected by cross bars 32 and are hung from side frames 6 of the machine by arms 33 (see Fig. 20) pivoted at their upper extremities to side frame 6 and at their lower extremities to outside plate 31 of the stapler carriage frame, thus permitting the carriage to be rocked or swung back and forth.

The stapler carriage is rocked on the arms 33 through the action of eccentric cams 34 mounted on a shaft 35 (hereinafter called the "stapler shaft") which is journaled in bearings supported by plates 29 and 31 of the stapler carriage frame and extends through an elongated opening in side frame 6 at each side of the machine. At each side of each of said openings and bolted to the outside of frame 6 is a plate 36. Each eccentric cam 34 is located between spaced plates 36 and bears against said plates. When shaft 35 is rotated it will be reciprocated horizontally through the action of eccentric cams 34 and plates 36. Rotation of shaft 35 causes reciprocation of the stapler carriage. The full and dotted lines in Figs. 20 and 21 illustrate the manner in which the eccentric cams 34 cooperate with the plates 36 when shaft 35 is rotated to cause the stapler carriage to reciprocate.

The staple forming and driving units of which there may be several (one for each binding wire to be stapled) are adjustably secured to a cross bar 37 supported by plates 29 of the stapler carriage. Said units, the details of which will be described hereinafter, are each operated by an arm 38 secured to a rock shaft 39 journaled in plates 29 and extending beyond said plates. Shaft 39 is rocked by eccentrics 40 on stapler shaft 35 acting through pitmen 41 and arms 42 fixed to rock shaft 39.

As shown in Figs. 34 to 36, the clincher units (one for each stapler head) which will be described in detail hereinafter are adjustably secured to a cross bar 44 slidable vertically in guideways formed in or secured to plates 29 of the carriage frame. The cross bar 44 is reciprocated vertically in timed relation to the operation of the stapler heads by cams 45 fixed to stapler shaft 35, which cams contact the under side of cross bar 44.

Stapler shaft 35 which operates both the stapler heads and the clincher units is rotated by power communicated from the drive shaft 21. As shown in Fig. 1, drive shaft 21 carries a pulley 47 keyed to drive shaft 21. A belt 48 connects pulley 47 with a pulley 49 loosely mounted on stapler shaft 35. Pulley 49 is clutched to stapler shaft 35 at selected times to cause rotation of stapler shaft 35. For this purpose a controllable clutch 50 (Figs. 3, 9, and 10) is employed and such clutch is thrown into and out of operation at selected times by the staple controlling mechanism presently to be described. A suitable clutch is shown in my co-pending application Serial No. 746,655, filed October 3, 1934, reference to which is made for a detailed description. Other types of controllable clutch may be used.

Figure 27:
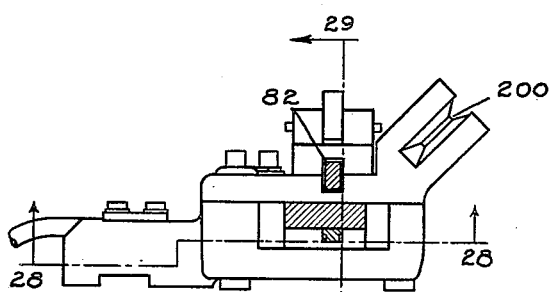
Fig. 27 is an enlarged top plan view of one of the staple forming and driving units.
Figure 28:
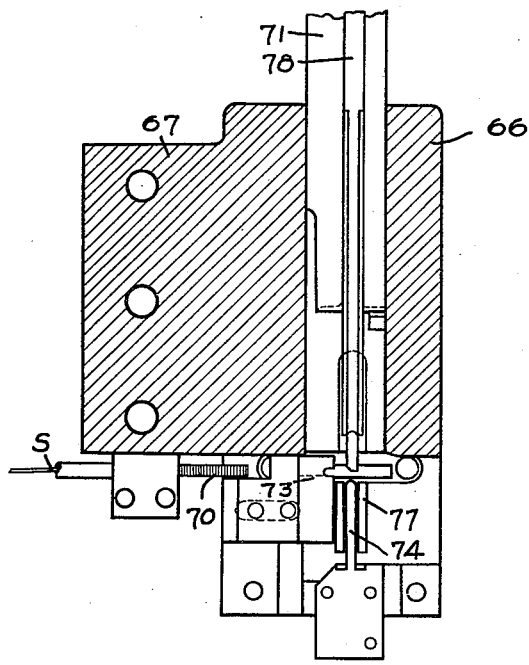
Fig. 28 is a sectional view taken on the line 28—28 of Fig. 27.
Figure 29:
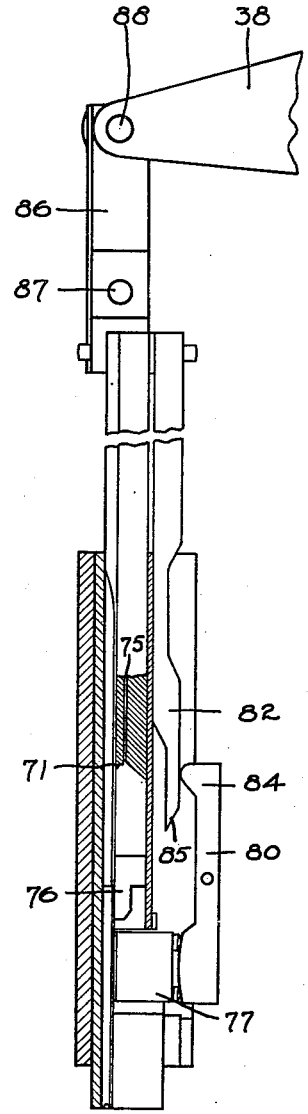
Fig. 29 is a sectional view taken on the line 29—29 of Fig. 27.

As shown in Fig. 1, the binding wire W for the box parts is carried on reels 51 supported by the upper framework of the machine, is guided beneath the staplers in the usual way by guide rollers 200 (see Fig. 27) and is pulled along by reason of its attachment to the moving work.

The staple stock wire S from which the staples are formed is carried by reels 52 also supported by the upper framework of the machine, and is fed to each stapler head continuously at substantially a uniform speed by the mechanism now to be described.

Referring to Figs. 24, 25, and 26, the staple stock wire S is drawn from reels 52 by feed rollers 53 and 54. Roller 53 is keyed to a shaft 55 journaled in plates 29 of the stapler carriage frame. Roller 54 is mounted on an eccentric 56 carried by a shaft 57 supported by plates 29 of the carriage frame. Roller 54 is free to rotate on eccentric 56. Extending from eccentric 56 is an arm 58. Secured to the outer end of arm 58 is a spring 59 the upper end of which is attached to one of the cross bars of the stapler carriage. The spring 59 is constructed and arranged to exert an upward pull on the outer end of the arm 58 to press roller 53 to grip the wire S between the two rollers so that when roller 53 is rotated the wire will be fed by the rollers to the staple forming and driving head.

To rotate the rollers, shaft 55 is rotated through a helix gear 60 keyed to stapler shaft 35, which helix gear meshes with a helix gear 61 on a shaft 62 journaled in bearings 63 carried by plate 29. The other end of shaft 62 carries a worm 64 which rotates a gear 65 fast on shaft 55.

Thus when stapler shaft 35 is rotated a strand of staple stock wire is fed to each stapling unit which operates to sever the continuously moving wire into proper lengths and form the severed pieces into staples and drive the same into the moving box parts.

As heretofore stated, the machine will be equipped with as many stapler units as there are binding wires to be stapled to the box parts. A description of one unit will suffice.

Referring to Figs. 27 to 33, the staple forming and driving elements operate in connected housings 66 and 67 which, as heretofore stated, are adjustably secured to cross bar 37 of the stapler carriage.

The staple stock wire S is fed by the feed rollers 53 and 54 through a flexible guide tube 70 toward a vertically reciprocating staple former 71 provided with a cutting edge 72 adapted to cooperate with a fixed cutter 73 carried by the housing and sever a length of wire upon the downstroke of the staple former 71.

Continued downward movement of the staple former 71 bends the severed wire over a loop bar 74 fixed to the housing to form a staple, as shown in Fig. 32.

While the staple former 71 is in the normal path of travel of the wire S, the wire is deflected by a beveled surface formed on one side of the staple former and is fed to one side of the staple former as shown in dotted lines in Fig. 31. The wire continues to be fed to one side of the staple former 71 until the staple former ascends above the normal path of travel of the wire S, whereupon the resilient guide tube 70 returns the wire S to the normal path of travel below the staple former 71 (see Fig. 30).

When the staple former 71 bends the severed wire over the loop bar 74 to form a staple, the legs of the formed staple are forced into grooves 75 of the former 71. After the staple has been formed the staple former 71 ascends. As the former 71 ascends, the staple is forced out of the grooves 75 by means of a stripper 76 carried by the housing (see Figs. 29 and 30).

When the staple is stripped from the grooves 75 of the former 71 it is engaged by a shifter block 77 and moved over against the inner side of a driver 78 which is rigidly secured to the front of former 71. As the former 71 ascends carrying the driver 78 with it, the staple pressed against the driver 78 by the shifter block 77 remains stationary until the driver 78 passes above the staple, whereupon the shifter block 77 shifts the staple into the path of reciprocation of the driver 78, the housing holding the staple beneath the driver. Upon the next down stroke of the former 71 and driver 78 the driver will engage and drive the staple downwardly into the work.

As shown in Fig. 30, shifter block 77 is formed with a recess 79 to receive the loop bar 74. Shifter block 77 is moved to shift the staple by a latch 80 which is pivoted to the housing. The block 77 is connected by compression springs 81 to the lower end of the latch 80. The upper end 84 of the latch 80 contacts a bar 82 secured to the vertically reciprocating staple former 71. The upper end of bar 82 is cut away or recessed, as shown at 83. When the head 84 of latch 80 is opposite the recess 83, block 77 may be moved to the right in Fig. 30 to withdraw the block 77 from the outer end of the loop bar 74 to permit the former 71 to form a staple over the loop bar. Block 77 is moved to draw it away from loop bar 74 by the action of bar 82 which is provided at its lower extremity with a cam surface 85 which engages the rear wall of the block 77 and forces the block to the right, as shown in Fig. 32, the recess 79 of the block permitting the lower end of the bar 82 to descend.

While the block 77 is positively shifted in both directions by the bar 82 and the latch 80, the spring connection between the latch 80 and the block 77 provides a pressure on the formed staple capable of yielding when it is pressed toward and beneath the driver 78.

It should be noted that the staple former and driver are connected to reciprocate together but in different vertical planes and that each staple after being formed by the staple former is positively shifted from the plane of reciprocation of the staple former to the plane of reciprocation of the staple driver, thus permitting the formation of one staple while another staple is being driven.

The upper end of staple former 71 may be connected to arm 38 by a slotted link 86 and pin connections 87 and 88 so that when arm 38 is rocked by shaft 39 as hereinbefore described, the staple former 71 will be reciprocated vertically.

The clincher mechanism is shown in Figs. 34 to 42. There will be as many clincher units as there are stapler units, and, as previously explained, the several clincher units are adjustably secured to the cross bar 44 which is vertically reciprocated in timed relation with the stapler operations by cams 45 on stapler shaft 35.

As shown in Fig. 36, the reduced ends of the cross bar 44 ride up and down between guide bars 90 secured to the inner faces of stapler carriage plates 29. The cams 45 on stapler shaft 35 acting on the bar 44 positively raise the bar 44 when shaft 35 is rotated.

While gravity will return bar 44 to initial position, a compression spring 91 may be interposed between the top of bar 44 and a cross plate 92 secured to guide bars 90 at each side of the stapler carriage to assist in returning bar 44 to initial position.

Referring to Fig. 34, each clincher unit consists of a body member 93 secured to the bar 44 by one or more set screws 94. Body member 93 is bored as at 95 to receive one or more plungers 96, the upper ends of which are connected to a clincher plate 97. Surrounding each plunger 96 and interposed between the plate 97 and a shoulder 98 in the bore 95 is a compression spring 99 which yieldingly holds the plate 97 in spaced relationship above the body member 93. The spaced relationship is limited by a head 100 on the lower end of plunger 96 which engages a shoulder 101 in the bore 95.

As shown in Fig. 37, the clincher plates 97 of the two outside clincher units upon which the work conveyor chains 1 ride may be provided with a longitudinal rib or flange 102 adapted to fit into a recess formed in the under side of the conveyor chain links and thus prevent any sidewise shifting of the work during a stapling operation.

In Figs. 37 to 42 the stapler unit is designated generally by the reference numeral 103. In Fig. 37 is shown a cleat b positioned in the channel-shaped conveyor chain 1 and a side sheet a on top of the cleat b in position to be stapled thereto. A binding wire c overlies the side sheet a in position to be straddled by the staple when driven. In said figure the bar 44 is in its lowermost position, thus providing plenty of clearance between the top of the moving work and the under side of the stapler unit 103.

When the stapler shaft 35 is thrown into operation in the manner hereinafter described, bar 44 is raised to the position shown in Fig. 38, bringing the work up into contact with stapler unit 103. During this movement the stapler and clincher units are moving with the conveyor chain 1 and the work. When the work is in the position shown in Fig. 38, the stapler drives a staple e over the binding wire, then through the sheet a and into the cleat b, the springs 99 having sufficient resistance to meet the thrust of the staple legs. When there is an additional thickness of material to be stapled such as the batten designated x in Fig. 39, the spring 99 is compressed as shown.

The clincher mechanism just described in which the clincher plate is spring-supported and in which the clincher unit raises the work into contact with the stapler unit for a staple driving operation is particularly advantageous in that such a clincher mechanism is adapted to operate without adjustment on various thicknesses of box parts.

Referring to Figs. 40 to 42, a different form of clincher plate 97 is shown. This form of clincher plate is used to clinch staples which are driven over the intermediate binding wires and through the side sheet material. In this form of clincher plate the rib or flange 102 is eliminated so that a horizontal surface may contact with and raise the side sheet a into contact with the stapler unit 103. In Fig. 40, the clincher plate 97 with the side sheet a above it is shown in its lowermost position providing plenty of clearance between the side sheet a and the stapler unit 103. In Fig. 41 the plate 97 has been raised, pressing the side sheet a upwardly against the stapler unit 103. When in this position the staple is driven through the side sheet a and the plate 97 curls the staple legs back into the side sheet a, as shown in dotted lines. Fig. 42 illustrates the operation of an inside clincher unit when an added thickness of material such as the batten x is being operated upon.

As heretofore pointed out, stapler shaft 35 is clutched to pulley 49 at selected times by a controllable clutch 50 to cause staple forming and driving operations.

Figure 23:
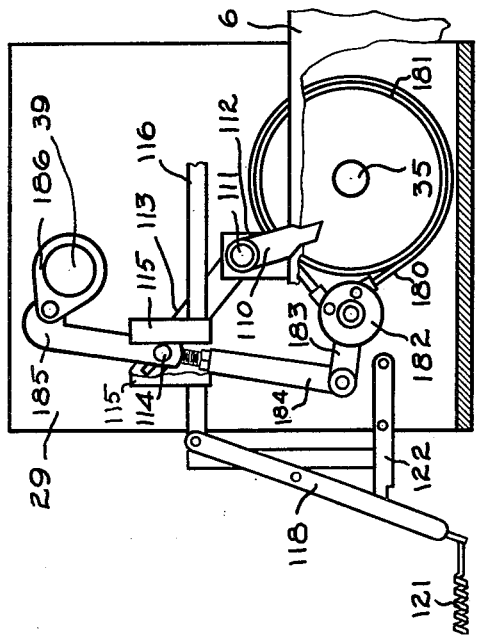
Figs. 22 and 23 are enlarged side elevations of the brake mechanism showing respectively the brake disengaged and engaged.
Figure 22:
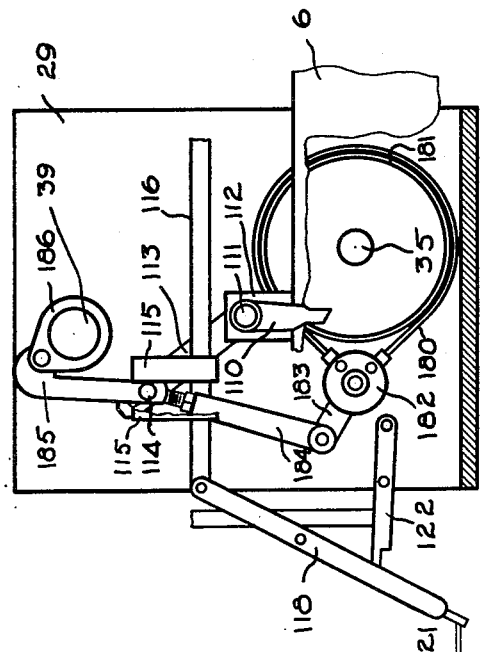

As best shown in Figs. 22 and 23, clutch 50 is operated by a buffer arm 110 secured to a rock shaft 111 journaled in a bracket 112 carried by side frame 6. Shaft 111 is rocked by an arm 113 carrying a pin 114 which extends between guide plates 115 carried by a movable bar 116.

As shown in Fig. 19, bar 116 is supported at one end on side frame 6 by means of a link 117 pivotally connected to the bar 116 and to the frame 6. The bar 116 is supported at the other end by a link 118 pivotally connected at one end to the bar 116 and pivotally connected intermediate its ends to the frame 6 as indicated at 119. The lower end of link 118 is connected to a pin 120 on frame 6 by a spring 121. Spring 121 normally tends to hold bar 116 and buffer arm 110 in the position shown in Fig. 22, in which position stapler shaft 35 is in clutching engagement with pulley 49. When bar 116 and buffer arm 110 are moved to the position shown in Fig. 23, the clutching engagement is broken and stapler shaft 35 ceases to rotate through the action of a braking mechanism presently to be described.

Buffer arm 110 is moved to clutching and nonclutching positions by movement of bar 116. Bar 116 is moved to the right in Fig. 19 to disengage the clutch 50 by a latch 122 pivoted to outside plate 31 of the stapler carriage. When in the lowered position shown in Fig. 19, the latch 122 will upon reciprocation of the stapler carriage engage a pin 123 on link 118 and move the lower end of the link 118 to the left in Fig. 19 against the action of the spring 121. This movement will move bar 116 to the right in Fig. 19 and move buffer arm 110 to disengage the clutch, thus stopping movement of the stapler carriage and the operation of the stapling units. The stapler carriage will remain inactive until latch 122 is raised to disengage pin 123, whereupon spring 121 will move link 118 and bar 116 to again engage clutch 50.

Latch 122 is raised and lowered at selected times to throw the staplers into and out of operation by means of a link 125 pivotally connected to an arm 126 extending from a bar 127 mounted to rock in bearings 128 carried by frame 6. When bar 127 is rocked in one direction, arm 126 will be raised, thus raising link 125 and latch 122, and when bar 127 is rocked in the other direction, arm 126, link 125, and latch 122 will be lowered.

Bar 127 is rocked by a screw block 130 (see Fig. 14) which travels back and forth lengthwise the bar 127 and engages control blocks 131 adjustably secured to the bar 127. As shown in Fig. 14, block 130 is provided with a threaded bore 132 to receive a screw 133 (see Fig. 10) journaled to rotate in bearings 134 supported by frame 6. The bottom of block 130 is provided with a groove 135 to straddle the top of frame 6 and prevent the block 130 from rotating with the screw 133, so that rotation of the screw 133 will cause block 130 to travel in one direction or the other lengthwise the screw, depending upon the direction of rotation of the screw.

As shown in Fig. 14, screw block 130 is provided with a U-shaped slide member 136 movable crosswise the block 130. Its movements are limited by pins 137. Extending from the inner face of each of the legs of the U-shaped slide member 136 is a pin 138, which upon movement of the screw block 130 engages a pin 139 or a pin 140 carried by the control blocks 131 to rock bar 127 in one direction or the other, pins 139 being located to cause the bar to rock in one direction and pins 140 being located to rock the bar in the other direction. As shown in Fig. 13, a control block 131 may carry a pin 139 and a pin 140 to cause a quick throw-out and throw-in of the clutch. The type of control block 131 and its location on the bar 127 will be governed by the spacing desired between staples.

As shown in Fig. 9, control blocks 131 are adjustably secured to each side of bar 127. When screw block 130 is moving in one direction, slide member 136 is shifted so that one of the pins 138 will contact with the pins 139 and 140 carried by the control blocks 131 on one side of the bar 127, while the other pin 138 on screw block 130 will not contact the pins 139 and 140 carried by the control blocks 131 on the other side of the bar 127. When the screw block 130 moves in the other direction, the slide member 136 is shifted to cause the other pin 138 to engage the pins 139 and 140 carried by the control blocks 131 on the other side of the bar 127.

The control blocks 131 on one side of the bar 127 are selected and set to control the location of the staples in a fraction of a unit of work and the control blocks 131 on the other side of the bar 127 are selected and set to control the location of the staples in another fraction of a unit of work. For example, the blocks 131 on one side of the bar 127 will control the number and location of the staples in section A of the box blank shown in Fig. 43, while the blocks 131 on the other side of the bar 127 will control the number and location of the staples in section B of said box blank. Sections A and C of the box blank being the same, and sections B and D of the box blank being the same, the same set of blocks may control the staples in sections B and D. Also, the control blocks may be arranged so that one set of blocks 131 on one side of the bar 127 may control the number and location of the staples in sections A and B, while the other set of blocks on the other side of the bar 127 may control the number and location of the staples in sections C and D. Also, the blocks may be arranged so that the blocks on one side of the bar 127 will control the number and location of staples in one unit of work, while the blocks on the other side of the bar 127 will control the number and location of staples in another and different unit of work. This latter arrangement makes it possible for the machine to operate successively on units of work differing in size and in number of staples required.

To cause block 130 to move lengthwise of screw 133 first in one direction and then in the other, the screw 133 is rotated first in one direction and then in the other by the mechanism now to be described.

Referring to Fig. 9, the left end of screw 133 carries a pinion 141 which meshes with pinions 142 and 143 loosely mounted on a shaft 144 journaled in brackets 145 carried by side frame 6. Pinions 142 and 143 are each provided with gear teeth 146 to engage the teeth 147 of a shift gear fixed to a sleeve 148 keyed to shaft 144. Sleeve 148 may be shifted along shaft 144 by a yoke 149 carried by a rock shaft 150 journaled in bearings 151 supported by bracket 145.

When shaft 144 is rotating and shift gear 147 is shifted into engagement with gear teeth 146 of pinion 142, screw 133 will be rotated in one direction. When shift gear teeth 147 are shifted into engagement with gear teeth 146 of pinion 143, screw 133 will be rotated in the other direction. When the shift gear is moved to neutral position between pinions 142 and 143 no motion will be imparted to screw 133.

Referring to Fig. 1, shaft 144 is rotated through a sprocket gear wheel 152 fast on shaft 144, a sprocket chain 153, reduction gearing 154, and a sprocket chain 155, which is driven by a sprocket gear on drive shaft 21.

As heretofore stated, rotation of screw 133 is controlled by rocking shaft 150 which through yoke 149 shifts gear teeth 146 to engage the teeth of pinion 142 or the teeth of pinion 143, or to neutral position. Shaft 150 is rocked through a link 156 fast on shaft 150 and pivotally connected to a rod 157 suitably supported by the framework to slide longitudinally in either direction.

In the operation of the machine, rod 157 is first moved from neutral position to cause screw 133 to rotate in one direction. It is then moved in the opposite direction to cause a reverse rotation of screw 133. It is then moved to neutral position to stop rotation of the screw.

In Fig. 9, rod 157 is in neutral position and screw 133 is not rotating. The first movement of rod 157 to cause rotation of screw 133 and throw the staple controlling mechanism into operation is controlled by the lead block 14 secured to a conveyor chain 1 in front of a unit of work. Block 14 engages a lug 160 carried by an arm 161 fixed to a rock shaft 162 journaled in bearings carried by a bracket 163 secured to frame 6. Block 14 depresses lug 160 and arm 161 and thereby rocks shaft 162. Fixed to shaft 162 and extending downwardly therefrom is an arm 164 carrying a pin 165 which contacts with the lower end of an arm 166 fixed to rod 157. When shaft 162 is rocked, pin 165 acting on arm 166 moves rod 157 and thereby starts rotation of screw 133.

In Figs. 9 and 10, screw block 130 has just started its travel to the left on screw 133. Block 130 continues to travel to the left on screw 133 successively engaging the pins 139 and 140 on control blocks 131 located on one side of bar 127 until the rotation of screw 133 is reversed, whereupon block 130 travels back to the other end of the screw successively engaging the pins 139 and 140 on blocks 131 located on the other side of the bar 127.

For reversing rotation of the screw 133, rod 157 carries a block 170 adjustably secured thereto by set screws. Block 170 is bored to receive a plunger 171 which lies in the path of travel of the screw block 130. Between the head of the plunger 171 and the block 170 is a spring 172 which normally holds the head of the plunger a predetermined distance from the block 170. When screw block 130 traveling to the left in Fig. 10 strikes plunger 171, it moves the plunger through the bore in block 170 against the action of spring 172. Located directly behind block 170 (to its left in Fig. 10) is a bell crank arm 173 pivoted by a bolt 174 to side frame 6. The lower horizontal portion 175 of the bell crank arm 173 prevents block 130 and rod 157 from moving when block 130 contacts and moves plunger 171. When, however, plunger 171 moves far enough to contact an extension 176 secured to the upper vertical portion of bell crank arm 173, the bell crank arm is moved, thus raising its lower portion 175 and permitting block 170 and rod 157 to move a sufficient distance to shift gear teeth 147 and reverse the rotation of screw 133.

To prevent overthrow of bell crank arm 173 and to return it to initial position when block 130 starts its return movement to the right in Fig. 10, a block 177 carrying a back plate 178 is adjustably secured to rod 157 directly beneath bell crank arm 173, as shown in Fig. 10. When rod 157 moves to the left in Fig. 10, block 177 moves with it and away from bell crank arm 173, thus permitting the bell crank arm to rock. When rod 157 is moved in the other direction, bell crank arm 173 is returned to initial position through the action of block 177 and its back plate 178.

When block 130 reaches its limit of travel to the left on screw 133 (in Fig. 10) the slide 136 on block 130 is shifted by a block 198 which contacts pin 137 on slide 136. A similar block 198 operates at the other or right hand end of screw 133 to shift slide 136.

When block 130 returns to its initial position at the right hand end of screw 133, it contacts an extension 179 of rod 157 and moves rod 157 a sufficient distance to move gear teeth 146 into neutral position between pinions 142 and 143 and thereby stop rotation of screw 133. The staple driving mechanism then remains at rest until another lead block 14 on conveyor chain 1 trips lug 160 and again starts operation of the staple controlling mechanism.

It will be noted that the staple controlling mechanism is thrown into operation by a lead block located in front of each unit of work on conveyor chains 1 and that the lead block merely depresses a controlling arm to start operation of the staple controlling mechanism, which thereafter operates independently of the conveyor chains through power communicated from the drive shaft. Such an arrangement relieves the conveyor chains and the blocks carried thereby of heavy actuating strains such as they were subjected to in prior machines.

When clutch 50 is disengaged a brake is automatically applied to stapler shaft 35 to stop rotation thereof. The braking mechanism is best shown in Figs. 22 and 23. As heretofore pointed out, the clutch is disengaged when latch 122 is lowered into engagement with pin 123 carried by link 118. When this engagement becomes effective, the return movement of the stapler carriage (to the right in Fig. 22) will move bar 116 to the left, thus moving pin 114 and arm 113 to the left. This movement rocks shaft 111 and moves buffer arm 110 into position to disengage the clutch. The same movement applies the brake as presently described.

In Fig. 22, the parts are shown with the clutch engaged and the braking mechanism released. In Fig. 23 the clutch is disengaged and the brake applied.

As shown in Fig. 22, a brake band 180 surrounds a brake drum 181 fast on stapler shaft 35. The ends of band 180 are secured at spaced points to a collar 182 mounted to rock on the stapler carriage frame. Rigidly secured to and extending from collar 182 is an arm 183 pivotally connected to a toggle arm 184, the upper end of which is pivoted to the pin 114. Extending upwardly from the pin 114 and also pivoted thereto is a toggle arm 185. The upper end of toggle arm 185 is pivoted to a link 186 fast on rock shaft 39. When bar 116 is moved to the left from the position shown in Fig. 22 to the position shown in Fig. 23, the toggle formed by the arms 184 and 185 will be straightened, thus lowering arm 183 and rocking collar 182 to tighten band 180 about drum 181. The tightening of the band 180 is assisted by the action of link 186 on rock shaft 39 which is adjusted to force toggle arms 185 and 184 downward at the proper time relative to the completion of a stapling operation to tighten the brake band about the drum.

The operation of the machine will be readily understood from the foregoing detailed description. Positioning blocks for the several units of work are fixed to the conveyor chains with a lead block 14 located in front of each unit of work to be operated upon. The proper staple control blocks 131 are adjusted on the bar 127 to control the desired number and location of staples in a unit of work. The machine is then started by shifting the drive belt to the drive pulley 20, whereupon conveyor chains 1 are advanced continuously at substantially a uniform speed to the stapling mechanism. When the first lead block 14 trips the lug 160, the staple controlling mechanism is thrown into operation and continues to operate until a unit of work has been completed, whereupon the staple controlling mechanism is automatically thrown out of operation. The next lead block 14 again throws the staple controlling mechanism into operation for the next unit of work.

It will be understood that the invention is not to be limited to the particular embodiment shown for purposes of illustration and that all of the features of the invention need not be used conjointly as they may be used to advantage in various combinations and sub-combinations as defined in the sub-joined claims.

The word "continuously" as used in the claims to define the movement or feed of the staple stock wire is intended to include a feed or movement which continues without interruption during a staple forming and driving cycle of operation as distinguished from a feed or movement which is interrupted during a staple forming and driving operation.

I claim:

1. A machine for fastening together box or crate parts comprising, in combination, a drive shaft rotatable about a fixed axis, work-feeding means, a carriage reciprocable in the direction of movement of the work, fastener setting mechanism on said carriage, a shaft to operate the fastener setting mechanism, said shaft being rotatably mounted on the carriage substantially parallel to the drive shaft and reciprocable with the carriage, and means to drive the latter shaft from the drive shaft.

2. A machine for fastening together box or crate parts comprising, in combination, work-feeding means, a carriage reciprocable in the direction of movement of the work, fastener setting mechanism on said carriage, a shaft to operate the fastener setting mechanism, said shaft being rotatably mounted on the carriage and reciprocable with the carriage, and means associated with the shaft to reciprocate the carriage upon rotation of the shaft.

3. A machine for fastening together box or crate parts comprising, in combination, work-feeding means, a carriage reciprocable in the direction of movement of the work, fastener setting mechanism on said carriage, a shaft to operate the fastener setting mechanism, said shaft being rotatably mounted on the carriage and reciprocable with the carriage, means associated with the shaft to reciprocate the carriage upon rotation of the shaft, and means to rotate the shaft.

4. A machine for fastening together box or crate parts comprising, in combination, work-feeding means, a carriage reciprocable in the direction of movement of the work, fastener setting mechanism on said carriage, a shaft to operate the fastener setting mechanism, said shaft being rotatably mounted on the carriage and reciprocable with the carriage, means associated with the shaft to reciprocate the carriage upon rotation of the shaft, and means to rotate said shaft from a drive shaft rotatable about a fixed axis.

5. A machine for fastening together box or crate parts comprising, in combination, work-feeding means, a carriage reciprocable in the direction of movement of the work, fastener setting mechanism on said carriage, a shaft to operate the fastener setting mechanism, said shaft being rotatably mounted on the carriage and reciprocable with the carriage, and cam means associated with the shaft to reciprocate the carriage upon rotation of the shaft.

6. A machine for fastening together box or crate parts comprising, in combination, work-feeding means, a carriage reciprocable in the direction of movement of the work, a stationary supporting frame for the carriage, fastener setting mechanism on said carriage, a shaft to operate the fastener setting mechanism, said shaft being rotatably mounted on the carriage and reciprocable with the carriage, and cam means on the shaft acting on the frame to reciprocate the carriage upon rotation of the shaft.

7. A machine for fastening together box or crate parts comprising, in combination, work-feeding means, a carriage reciprocable in the direction of movement of the work, a stationary supporting frame for the carriage, fastener setting mechanism on said carriage, a shaft to operate the fastener setting mechanism, said shaft being rotatably mounted on the carriage and reciprocable with the carriage, cam means on the shaft acting on the frame to reciprocate the carriage upon rotation of the shaft, and means to rotate the shaft.

8. A machine for fastening together box or crate parts comprising, in combination, work-feeding means, a carriage reciprocable in the direction of movement of the work, fastener setting mechanism on said carriage, a shaft to operate the fastener setting mechanism, said shaft being rotatably mounted on the carriage and reciprocable with the carriage, and means to rotate the shaft at varying intervals to control the location of the fasteners in the work.

9. A machine for fastening together box or crate parts comprising, in combination, work-feeding means, a carriage reciprocable in the direction of movement of the work, fastener setting mechanism on said carriage, a shaft to operate the fastener setting mechanism, said shaft being rotatably mounted on the carriage and reciprocable with the carriage, and a pattern of controlling members to cause rotation of the shaft at varying intervals to control the location of the fasteners in the work.

10. A machine for fastening together box or crate parts comprising, in combination, work-feeding means, a carriage reciprocable in the direction of movement of the work, fastener setting mechanism on said carriage, a shaft to operate the fastener setting mechanism, said shaft being rotatably mounted on the carriage and reciprocable with the carriage, and means to rotate the shaft at varying intervals to control the location of the fasteners in the work, said means being thrown into operation as each unit of work reaches a fastener setting mechanism and continuing to operate until the unit of work passes the fastener setting mechanism.

11. A machine for stapling box or crate parts comprising, in combination, a drive shaft journaled in fixed bearings, work-feeding means, a carriage reciprocable in a direction substantially at right angles to the axis of the drive shaft, staple forming and driving mechanism on said carriage, a shaft to operate said mechanism rotatably mounted on the carriage and reciprocable therewith, and means to drive the stapler shaft from the drive shaft.

12. A machine for stapling box or crate parts comprising, in combination, work-feeding means, a carriage reciprocable in the direction of movement of the work, staple forming and driving mechanism on said carriage adapted to drive staples into moving work, a shaft to operate said mechanism rotatably mounted on the carriage and reciprocable therewith, and means to rotate the stapler shaft at varying intervals to control the location of staples in the work.

13. A machine for fastening together box or crate parts comprising, in combination, work-feeding means, a carriage reciprocable in the direction of movement of the work, fastener setting mechanism on said carriage adapted to drive fasteners into moving work, a shaft to operate the fastener setting mechanism rotatably mounted on the carriage and reciprocable with the carriage, and means to rotate the shaft at varying intervals to control the location of fasteners in the work.

14. In a machine of the character described, the combination of fastener setting mechanism, a carriage for the fastener setting mechanism, said carriage being supported at each side by a plurality of spaced legs pivotally connected to the carriage, means to feed box or crate parts to the fastener setting mechanism, and means to rock the carriage on its legs during a fastener setting operation.

15. In a machine of the character described, the combination of fastener setting mechanism operable upon moving work, a carriage therefor, a rotating shaft carried by the carriage, and means associated with the shaft for causing movement of the carriage.

16. In a machine of the character described, the combination of fastener setting mechanism, a carriage therefor, a rotating shaft carried by the carriage, and means associated with the shaft for causing movement of the carriage, said means including an eccentric cam carried by the shaft.

17. In a machine for use in making boxes or crates, staple forming and driving mechanism comprising a staple former, a staple driver, means to feed staple stock wire continuously to the staple former, and positively actuated means for shifting a formed staple from the staple former to the staple driver.

18. In a stapling machine, a reciprocating staple former, a staple driver reciprocating therewith but in a different parallel plane, means to feed staple stock wire continuously to the staple former, and positively actuated means to shift a formed staple from the path of reciprocation of the staple former to the path of reciprocation of the staple driver, whereby one staple is formed while another staple is being driven.

19. In a machine of the character described, the combination of staple driving mechanism, staple clinching mechanism including a spring-supported clincher plate, means to feed box or crate parts therebetween, and means to move the clinching mechanism toward the staple driving mechanism to press yieldingly the box part thereagainst during a staple driving operation.

20. In a machine of the character described, staple driving mechanism, a clincher block including a spring-supported clincher plate, means to feed box or crate parts therebetween, means to move the driving mechanism and the clincher block with the box parts during a staple driving operation, and means to move the clincher block toward the staple driving mechanism to press yieldingly the box parts thereagainst during a staple driving operation.

21. In a machine of the character described, the combination of a staple driver, a work conveyor located beneath the driver, a spring-supported block located beneath the conveyor, and means to raise the block and through the block the conveyor to press the work on the conveyor into contact with the driving mechanism during a driving operation.

22. In a machine of the character described, a staple driver, a work conveyor movable beneath the driver, a spring-supported block located beneath the conveyor, means to raise the block and through the block the conveyor to press the work on the conveyor into contact with the driving mechanism during a driving operation, and means to move the driving mechanism and the block with the conveyor during a staple driving operation.

23. In a machine of the character described, the combination of means to feed box parts, a carriage reciprocable in the direction of movement of the box parts, fastener setting mechanism on said carriage operable upon moving box parts, a rotatable shaft on said carriage and movable therewith for operating the fastener setting mechanism, and braking mechanism for said shaft movable with said carriage.

24. In a machine of the character described, the combination of means to feed box parts, a carriage reciprocable in the direction of movement of the box parts, fastener setting mechanism on said carriage, a rotatable shaft on said carriage and movable therewith for operating the fastener setting mechanism, braking mechanism for said shaft movable with said carriage, and means to control rotation of said shaft and the operation of said braking mechanism.

25. In a machine of the character described, the combination of fastener setting mechanism and means to control its operation to locate fasteners at predetermined points in the work, said means including a rocking bar, control blocks adjustably secured to each side of the bar, a rotatable screw, a screw block carried by the screw and adapted to travel lengthwise the screw upon rotation of the screw, means carried by the screw block to engage the control blocks on one side of the rocking bar when the screw block is moving in one direction and to engage the control blocks on the other side of the rocking bar when the screw block is moved in the other direction, and means to rotate the screw alternately in opposite directions to cause the screw block to travel back and forth thereon.

26. In a machine of the character described, the combination of fastener setting mechanism, a carriage for the fastener setting mechanism, said carriage being supported by legs pivotally connected to the carriage, means to feed box or crate parts to the fastener setting mechanism, and means to rock the carriage on its legs during a fastener setting operation.

27. In a machine of the character described, the combination of fastener setting mechanism, a carriage therefor, a rotatable shaft carried by the carriage, and means associated with the shaft for causing movement of the carriage, said means including a cam carried by the shaft.

ALFRED L. ROSENMUND.